(12) United States Patent
Nair et al.

(10) Patent No.: US 11,582,599 B2
(45) Date of Patent: Feb. 14, 2023

(54) METHOD AND APPARATUS FOR REMOTE PROVISIONING OF PROTECTION POLICIES IN AN EDGE NODE BASED ON SIGNALING BETWEEN EDGE NODES

(71) Applicant: Nokia Technologies Oy, Espoo (FI)

(72) Inventors: Suresh Nair, Whippany, NJ (US); Anja Jerichow, Grafing bei München (DE); Nagendra S Bykampadi, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/045,965

(22) PCT Filed: Apr. 8, 2019

(86) PCT No.: PCT/EP2019/058809
§ 371 (c)(1),
(2) Date: Oct. 7, 2020

(87) PCT Pub. No.: WO2019/197339
PCT Pub. Date: Oct. 17, 2017

(65) Prior Publication Data
US 2021/0360393 A1     Nov. 18, 2021

(30) Foreign Application Priority Data
Apr. 9, 2018    (IN) .............................. 201841013516

(51) Int. Cl.
*H04W 12/00*      (2021.01)
*H04W 8/12*      (2009.01)
(Continued)

(52) U.S. Cl.
CPC ........... *H04W 12/009* (2019.01); *H04W 8/12* (2013.01); *H04W 12/106* (2021.01); *H04W 84/042* (2013.01)

(58) Field of Classification Search
CPC ... H04W 12/009; H04W 84/042; H04W 8/12; H04W 12/106
See application file for complete search history.

(56) References Cited

U.S. PATENT DOCUMENTS 10,028,249 B2 *   7/2018   Ramkumar ........... H04W 68/00
10,548,004 B2     1/2020   Bykampadi et al.
(Continued)

FOREIGN PATENT DOCUMENTS

EP             1350151 A2    10/2003
WO    WO 2002/042861 A3    2/2003
WO    WO 2008/001953 A1    1/2008

OTHER PUBLICATIONS

"3rd Generation Partnership Project; Technical Specification Group Services and System Aspects; Security architecture and procedures for 5G system (Release 15)", 3GPP TS 33.501, V15.0.0, Mar. 2018, pp. 1-128.
(Continued)

*Primary Examiner* — Viral S Lakhia
(74) *Attorney, Agent, or Firm* — Alston & Bird LLP (57) ABSTRACT

A method, apparatus and computer program product may be provided for signaling-based remote provisioning and updating of protection policy information in a SEPP of a visited network. A method may include obtaining, at a home network node (hSEPP), protection policy information from a local repository in a home network or via configuration. The hSEPP is a network node at a boundary of the home netowork, and the home network is a public land mobile network (hPLMN). The method includes distributing, via a signaling interface, the protection policy information to a
(Continued)

visited network node (vSEPP) within a visited network (vPLMN). The vSEPP is a network node at a boundary of a second network. The protection policy information includes information regarding protection of signaling messages addressed for network functions (NFs) hosted in the hPLMN and is configured for enabling the vSEPP to selectively protect outgoing messages to hSEPP in the home network.

15 Claims, 7 Drawing Sheets

(51) Int. Cl.
*H04W 12/106* (2021.01)
*H04W 84/04* (2009.01)

(56) References Cited

U.S. PATENT DOCUMENTS

| | | | | |
|---|---|---|---|---|
| 10,601,776 | B1* | 3/2020 | Burakovsky | H04L 63/0227 |
| 11,259,046 | B2* | 2/2022 | Kim | H04N 19/105 |
| 2008/0076392 | A1* | 3/2008 | Khetawat | H04W 12/0431 |
| | | | | 455/411 |
| 2014/0003233 | A1* | 1/2014 | Rune | H04L 47/125 |
| | | | | 370/230 |
| 2014/0304777 | A1* | 10/2014 | Lehtovirta | H04W 4/70 |
| | | | | 726/3 |
| 2016/0006753 | A1* | 1/2016 | McDaid | H04W 12/128 |
| | | | | 726/23 |
| 2018/0176882 | A1* | 6/2018 | Ramkumar | H04W 88/04 |
| 2019/0141081 | A1* | 5/2019 | Kunz | H04W 8/04 |
| 2019/0251241 | A1 | 8/2019 | Bykampadi et al. | |
| 2019/0253395 | A1 | 8/2019 | Bykampadi et al. | |
| 2019/0253461 | A1 | 8/2019 | Bykampadi et al. | |
| 2019/0260803 | A1 | 8/2019 | Bykampadi et al. | |
| 2020/0100101 | A1* | 3/2020 | Torvinen | H04L 63/0428 |
| 2021/0136633 | A1* | 5/2021 | Zetterlund | H04W 36/26 |

OTHER PUBLICATIONS

"3rd Generation Partnership Project; Technical Specification Group Services and System Aspects; System Architecture for the 5G System; Stage 2 (Release 15)", 3GPP TS 23.501, V15.1.0, Mar. 2018, pp. 1-201.

International Search Report and Written Opinion received for corresponding Patent Cooperation Treaty Application No. PCT/EP2019/058809, dated Jun. 28, 2019, 12 pages.

"Stepwise way forward for SBA security: SEPP-SEPP security capability", 3GPP TSG SA WG3 (Security) Meeting #90Bis, S3-180710, Agenda: 4.1.13.1, Ericsson, Feb. 26-Mar. 2, 2018, 3 pages.

"Policies for IE protection at SEPP", 3GPP TSG SA WG3 (Security) Meeting #90Bis, S3-180897, Agenda: 4.1.13.1, Ericsson, Feb. 26-Mar. 2, 2018, 3 pages.

"3rd Generation Partnership Project; Technical Specification Group Services and System Aspects; Security Aspects; Study on security aspects of the 5G Service Based Architecture (SBA) (Release 16)", 3GPP TR 33.855, V1.4.0, Mar. 2019, pp. 1-57.

Office Action for European Application No. 19717460.0 dated Oct. 12, 2022, 3 pages.

First Examination Report for Indian Application No. 201841013516 dated Oct. 10, 2022, 8 pages.

\* cited by examiner

METHOD AND APPARATUS FOR REMOTE PROVISIONING OF PROTECTION POLICIES IN AN EDGE NODE BASED ON SIGNALING BETWEEN EDGE NODES

RELATED APPLICATION

This application claims priority to PCT Application No. PCT/EP2019/058809, filed on Apr. 8, 2019, which claims priority to Indian Application No. 201841013516, filed on Apr. 9, 2018, each of which is incorporated herein by reference in its entirety.

TECHNICAL FIELD

An example embodiment relates generally to a method and apparatus for the remote provisioning of protection policies between edge nodes and, more particularly, for facilitating signaling-based remote provisioning and updating of the protection information in a Security Edge Protection Proxy (SEPP) of the roaming partner's network.

BACKGROUND

In $5^{th}$ generation wireless systems (5G), Service Based Architecture (SBA), defined in TS 23.501, is introduced to model services as network functions (NFs) that communicate with each other using representation state transfer (REST)ful application programming interfaces (APIs). In the scenario where the two communicating NFs are in two different public land moble networks (PLMNs), communication happens over the roaming interface between the two participating PLMNs.

To protect NF specific content in the messages that are sent over the roaming interface, 5G introduces SEPP as the entity sitting at the perimeter of the PLMN network and acting as a gateway that protects all the traffic going out of the network. The SEPP implements application layer security for all the data exchanged between two inter-network NFs at the service layer.

Application layer security involves protecting information sent in various parts of the hypertext transfer protocol (HTTP) message, including HTTP Request/Response Line, HTTP header and HTTP Payload. However, differing levels of protection may be required for different parts of the message. For example, some parts of the message may need to be encrypted, while the rest of the message may require integrity protection.

BRIEF SUMMARY

A method, apparatus and computer program product are provided in accordance with an example embodiment in order to facilitate signaling-based remote provisioning and updating of the protection information in a visiting SEPP of a visited network. In particular, the instant application describes a mechanism for providing a signaling based approach for the remote provisioning and updating of protection policy information, for example stored in a protection policy file, thus enabling the SEPP (e.g., hSEPP) sitting at the edge of the home network hosting the network functions and their resources to distribute the policy file to the SEPP (vSEPP) in the roaming network. In particular, hSEPP may obtain the protection policy information from a centralized repository, for example, from a Network Repository Function (NRF), or through local configuration, such as, for example, through an Operation, Administration, and Maintenance (OAM) interface that directly configures hSEPP with the protection policy information, and subsequently utilize a signaling channel with vSEPP to provide this information to the vSEPP, for example, over the N32 interface. The remote vSEPP thus obtains the necessary information required to protect outgoing messages destined towards hSEPP in the home network, thus improving the security between the home network (e.g., hPLMN) and the visited network (e.g., vPLMN).

A method may be provided comprising obtaining, at a home security edge protection proxy, a protection policy information from a local repository in a home network, the home security edge protection proxy being a network node at a boundary of the home network, and the home network being a public land mobile network, and distributing, via a signaling interface, the protection policy information to a visited security edge protection proxy within a visited public land mobile network, the visited security edge protection proxy being a network node at a boundary of the visited public land mobile network, wherein the protection policy information comprises information regarding protection of signaling messages addressed for network functions hosted in the home public land mobile network and configured for enabling the visited security edge protection proxy to selectively protect outgoing messages addressed to network functions in the home network.

A method may be provided wherein the obtaining, at the home security edge protection proxy, of the protection policy information comprises one of pulling the protection policy information from a repository function by the home security edge protection proxy or loading the protection policy information from a configuration stored at the home security edge protection proxy. A method may be provided, wherein the obtaining, at the home security edge protection proxy, of the protection policy information comprises receiving, at the home security edge protection proxy, from a repository function, the protection policy information. A method may be provided, wherein the obtaining, at the home security edge protection proxy, of the protection policy information comprises provisioning, at the home security edge protection proxy, from an Operation, Administration, and Maintenance interface, the protection policy information.

A method may be provided, wherein the signaling interface comprises an N32 interface. In some embodiments, the method may further comprise receiving, at the home security edge protection proxy, from the repository function, updated protection policy information in an instance in which an update occurs to the protection policy information, and distributing, via the signaling interface, the updated protection policy information to the visited security edge protection proxy. A method may be provided, wherein the obtaining, at the home security edge protection proxy, of the protection policy information comprises receiving out-of-band at the home security edge protection proxy, the protection policy information.

A method may be provided, wherein the protection policy information is stored on a per roaming operator basis. A method may be provided, wherein the protection policy information is stored on a per network function type basis, and further comprising receiving updated protection policy information only upon a change in policy for an existing network function type or registration of a new network function type.

An apparatus may be provided, the apparatus comprising means for obtaining, at a home security edge protection proxy, a protection policy information from a local repository in a home network, the home security edge protection proxy being a network node at a boundary of the home network, and the home network being a public land mobile network, and means for distributing, via a signaling interface, the protection policy information to a visited security edge protection proxy within a visited public land mobile network, the visited security edge protection proxy being a network node at a boundary of the visited public land mobile network, wherein the protection policy information comprises information regarding protection of signaling messages addressed for network functions hosted in the home public land mobile network and configured for enabling the visited security edge protection proxy to selectively protect outgoing messages addressed to network functions in the home network.

An apparatus may be provided, wherein the means for obtaining, at the home security edge protection proxy, of the protection policy information comprises one of means for pulling the protection policy information from a repository function by the home security edge protection proxy or means for loading the protection policy information from a configuration stored at the home security edge protection proxy. An apparatus may be provided, wherein the means for obtaining, at the home security edge protection proxy, of the protection policy information comprises means for receiving, at the home security edge protection proxy, from a repository function, the protection policy information. An apparatus may be provided, wherein the means for obtaining, at the home security edge protection proxy, of the protection policy information comprises means for provisioning, at the home security edge protection proxy, from an Operation, Administration, and Maintenance interface, the protection policy information.

An apparatus may be provided, wherein the signaling interface comprises an N32 interface. The apparatus may further comprise means for receiving, at the home security edge protection proxy, from the repository function, updated protection policy information in an instance in which an update occurs to the protection policy information, and means for distributing, via the signaling interface, the updated protection policy information to the visited security edge protection proxy.

An apparatus may be provided, wherein the means for obtaining, at the home security edge protection proxy, of the protection policy information comprises means for receiving out-of-band at the home security edge protection proxy, the protection policy information. An apparatus may be provided, wherein the protection policy information is stored on a per roaming operator basis. An apparatus may be provided, wherein the protection policy information is stored on a per network function type basis, and the apparatus further comprising means for receiving updated protection policy information only upon a change in policy for an existing network function type or registration of a new network function type.

An apparatus may be provided, the apparatus comprising at least one processor and at least one memory including computer program code for one or more programs, the at least one memory and the computer program code configured to, with the at least one processor, cause the apparatus at least to obtain, at a home security edge protection proxy, a protection policy information from a local repository in a home network, the home security edge protection proxy being a network node at a boundary of the home network, and the home network being a public land mobile network, and distribute, via a signaling interface, the protection policy information to a visited security edge protection proxy within a visited public land mobile network, the visited security edge protection proxy being a network node at a boundary of the visited public land mobile network, wherein the protection policy information comprises information regarding protection of signaling messages addressed for network functions hosted in the home public land mobile network and configured for enabling the visited security edge protection proxy to selectively protect outgoing messages addressed to network functions in the home network.

An apparatus may be provided, wherein the obtaining, at the home security edge protection proxy, of the protection policy information comprises one of pulling the protection policy information from a repository function by the home security edge protection proxy or loading the protection policy information from a configuration stored at the home security edge protection proxy. An apparatus may be provided, wherein the obtaining, at the home security edge protection proxy, of the protection policy information comprises receiving, at the home security edge protection proxy, from a repository function, the protection policy information. An apparatus may be provided, the obtaining, at the home security edge protection proxy, of the protection policy information comprises provisioning, at the home security edge protection proxy, from an Operation, Administration, and Maintenance interface, the protection policy information.

An apparatus may be provided, wherein the signaling interface comprises an N32 interface. An apparatus may be provided, wherein the at least one memory and the computer program code are further configured to, with the at least one processor, cause the apparatus to receive, at the home security edge protection proxy, from the repository function, updated protection policy information in an instance in which an update occurs to the protection policy information, and distribute, via the signaling interface, the updated protection policy information to the visited security edge protection proxy.

An apparatus may be provided, wherein the obtaining, at the home security edge protection proxy, of the protection policy information comprises receiving out-of-band at the home security edge protection proxy, the protection policy information. An apparatus may be provided, wherein the protection policy information is stored on a per roaming operator basis. An apparatus may be provided, wherein the protection policy information is stored on a per network function type basis, and wherein the at least one memory and the computer program code are further configured to, with the at least one processor, cause the apparatus to receive updated protection policy information only upon a change in policy for an existing network function type or registration of a new network function type.

A computer program product may be provided, the computer program product comprising at least one non-transitory computer-readable storage medium having computer-executable program code instructions stored therein, the computer-executable program code instructions comprising program code instructions configured, upon execution, to obtain, at a home security edge protection proxy, a protection policy information from a local repository in a home network, the home security edge protection proxy being a network node at a boundary of the home network, and the home network being a public land mobile network, and distribute, via a signaling interface, the protection policy information to a visited security edge protection proxy within a visited public land mobile network, the visited security edge protection proxy being a network node at a boundary of the visited public land mobile network, wherein the protection policy information comprises information regarding protection of signaling messages addressed for network functions hosted in the home public land mobile network and configured for enabling the visited security edge protection proxy to selectively protect outgoing messages addressed to network functions in the home network.

A computer program product may be provided, wherein the obtaining, at the home security edge protection proxy, of the protection policy information comprises one of pulling the protection policy information from a repository function by the home security edge protection proxy or loading the protection policy information from a configuration stored at the home security edge protection proxy. A computer program product may be provided, wherein the obtaining, at the home security edge protection proxy, of the protection policy information comprises receiving, at the home security edge protection proxy, from a repository function, the protection policy information. A computer program product may be provided, wherein the obtaining, at the home security edge protection proxy, of the protection policy information comprises provisioning, at the home security edge protection proxy, from an Operation, Administration, and Maintenance interface, the protection policy information.

A computer program product may be provided, wherein the signaling interface comprises an N32 interface. A computer program product may be provided, wherein the computer-executable program code instructions further comprise program code instructions configured, upon execution, to receive, at the home security edge protection proxy, from the repository function, updated protection policy information in an instance in which an update occurs to the protection policy information, and distribute, via the signaling interface, the updated protection policy information to the visited security edge protection proxy.

A computer program product may be provided, wherein the obtaining, at the home security edge protection proxy, of the protection policy information comprises receiving out-of-band at the home security edge protection proxy, the protection policy information.

A computer program product may be provided, wherein the protection policy information is stored on a per roaming operator basis. A computer program product may be provided, wherein the protection policy information is stored on a per network function type basis, and wherein the computer-executable program code instructions further comprise program code instructions configured, upon execution, to receive updated protection policy information only upon a change in policy for an existing network function type or registration of a new network function type.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in order to provide for remote provisioning of protection policies in an edge node based on signaling, such as N32 signaling, between edge nodes. In 5G Service Based Architecture, HTTP based signaling flows are protected by the SEPP before they are sent to the roaming network partner over the corresponding N32 interface. For outgoing messages, selective protection is applied to the message by the sending SEPP, wherein parts of the message undergo encryption, for example, to prevent eavesdropping on sensitive information, integrity protection, for example, to allow reading by the middlebox, but prevent modification, and integrity protection with modification tracking, for example, to allow modification by the middlebox, but to enable detecting what was modified, and which middlebox has performed the modification.

Upon reception of the message from the N32 interface, the receiving SEPP in the roaming network decodes the received message after necessary verification, and rebuilds the HTTP signaling message to be sent internally to the corresponding network function. This requires the sending SEPP to know how to selectively protect each part of the message received from the network function, and the receiving SEPP to know how to treat the received protected message from the roaming partner to recreate the message to be forwarded to the network function.

Figure 1:
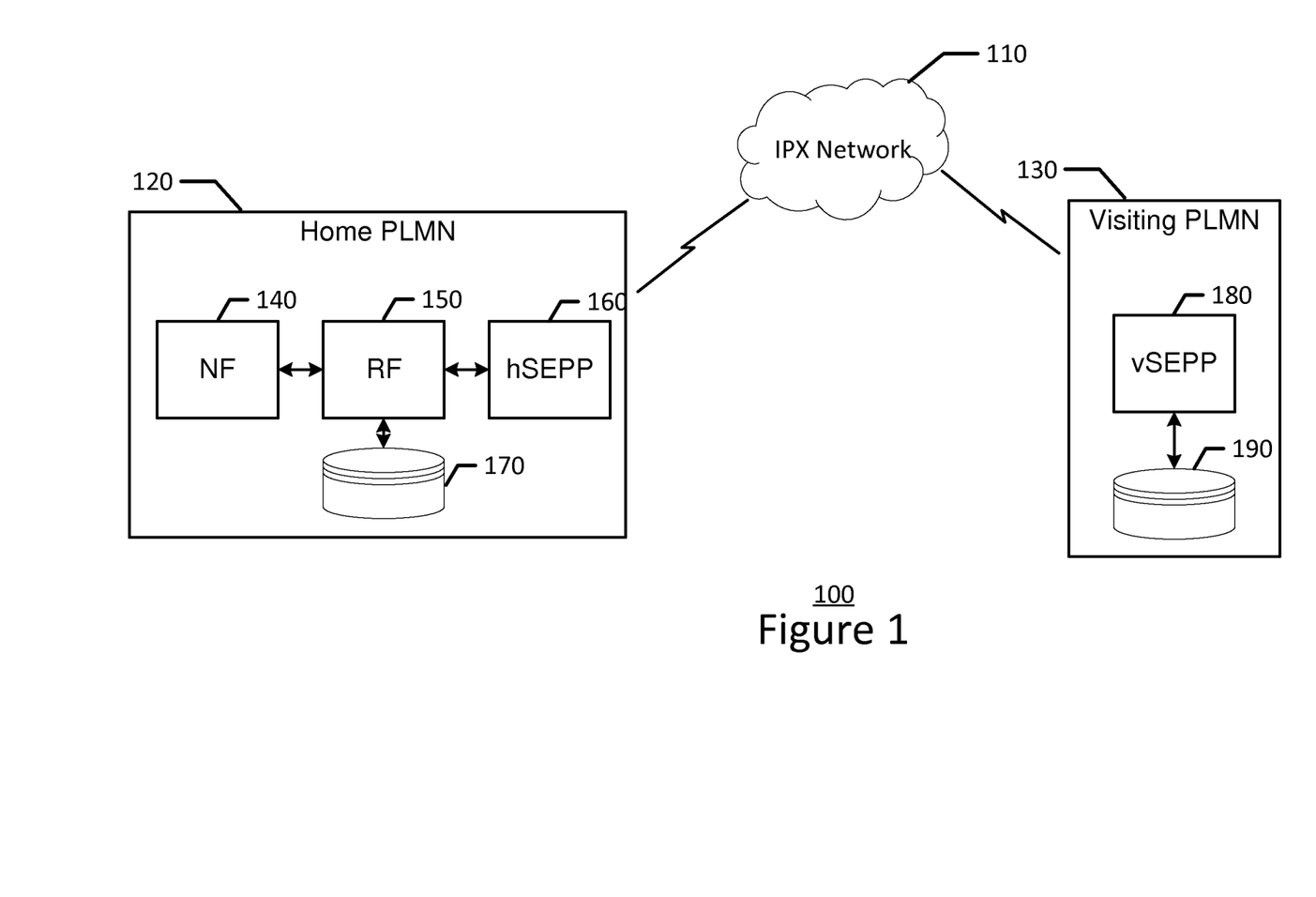
FIG. 1 is a block diagram of a system that may be specifically configured to facilitate signaling-based remote provisioning and updating of the protection information, in accordance with an example embodiment of the present disclosure.

A method, apparatus and computer program product are provided in order to provide for remote provisioning of protection policies in an edge node based on n32 signaling between edge nodes. Referring to FIG. 1, two networks including, for example, a home network and a vistited network configured to communicate via an internetworking protocol, such as for example, as supported by an internetwork packet exchange (IPX) network 110. The home network, which as shown, may be, for example, home PLMN (hPLMN) 120 is an operator network that hosts network functions (NFs) 140 providing a set of services to the other NFs, including NFs in the remote partner network. The hPLMN 120 may include a home SEPP (hSEPP) 160, the hSEPP 160 being a network node at the boundary of the Home PLMN 120 that obtains the protection policy from a repository 170 in hPLMN 120, and uses its signaling connection 110 with the vistited SEPP 180 to remotely provision the policy in the visiting SEPP 180.

The vistited network, which as shown, may include a vistited SEPP (vSEPP) 180, the vSEPP 180 being a network node at the boundary of the network that receives the protection policy from the hSEPP 160 that contains information on how to protect signaling messages addressed for NFs 140 hosted in the hPLMN 120. The hPLMN 120 may further include a repository function (RF) 150, the repository function 150 being an entity in the hPLMN 120 that stores protection policy information applicable to all the NFs 140 in the hPLMN 120. RF 150 may also be a service in an existing network function, for example, NF 140.

Figure 2:
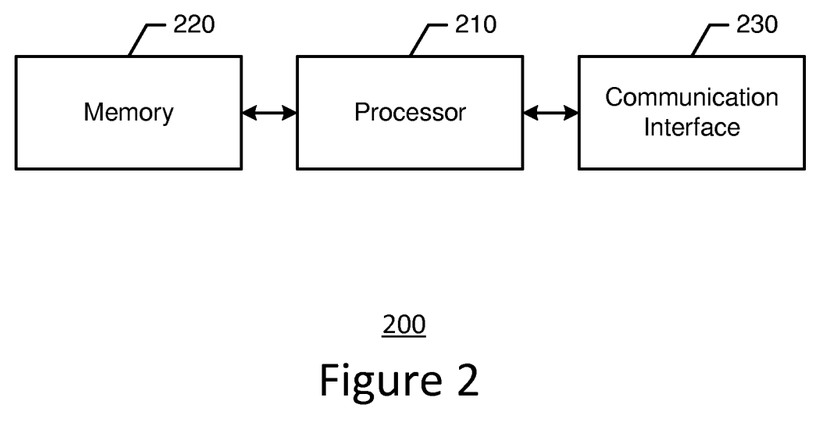
FIG. 2 is a block diagram of an apparatus that may be specifically configured in accordance with an example embodiment of the present disclosure.

In order to provide for remote provisioning of protection policies in an edge node based on signaling, such as N32 signaling, between edge nodes, an apparatus 200 is provided and as shown, for example, in FIG. 2. The apparatus may be embodied by any of a variety of different components and, in one embodiment, is embodied by an edge node of the hPLMN, such as the hSEPP 160 of the hPLMN 120. As shown in FIG. 2, the apparatus of an example embodiment includes, is associated with or is otherwise in communication with a processor 210, an associated memory 220 and a communication interface 230.

The processor 210 (and/or co-processors or any other circuitry assisting or otherwise associated with the processor) may be in communication with the memory device 220 via a bus for passing information among components of the apparatus 200. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The apparatus 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 210 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 210 may be configured to execute instructions stored in the memory device 220 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication interface 230 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Figure 3:
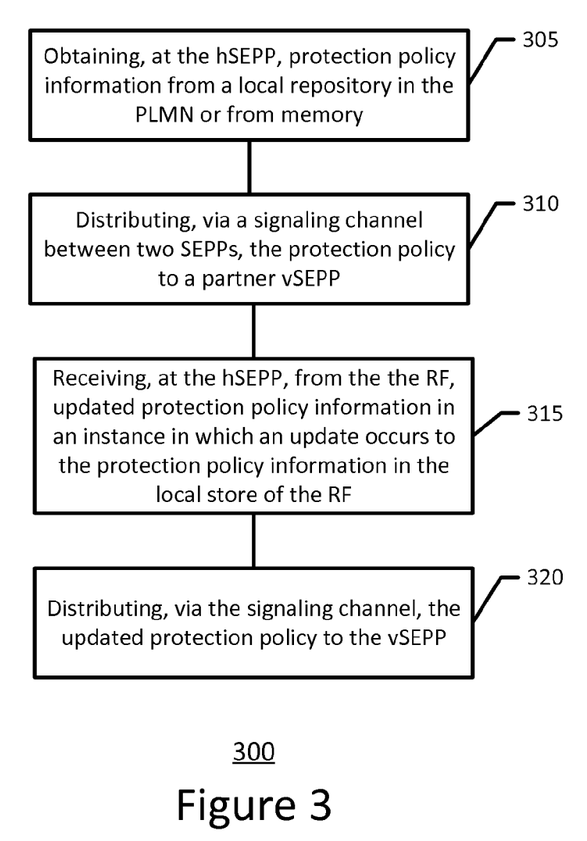
FIG. 3 is a flowchart depicting operations performed, such as by the apparatus of FIG. 2, to facilitate signaling-based remote provisioning and updating of the protection information in accordance with a example embodiment of the present disclosure.
Figure 4A:
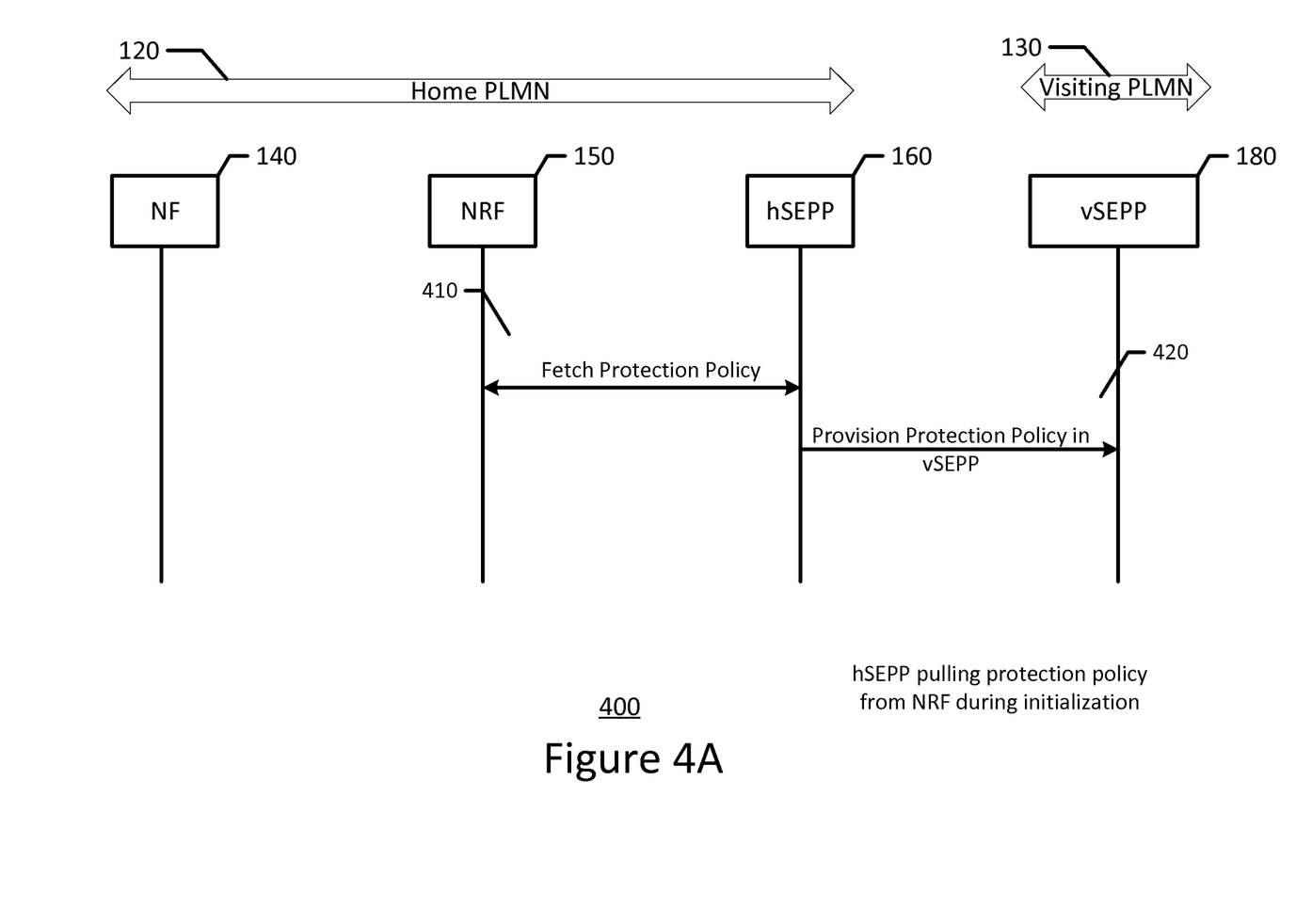
FIGS. 4A, 4B, and 4C are signal flow diagrams, each showing an operation of an example system in accordance with an embodiment of the present disclosure.
Figure 4B:
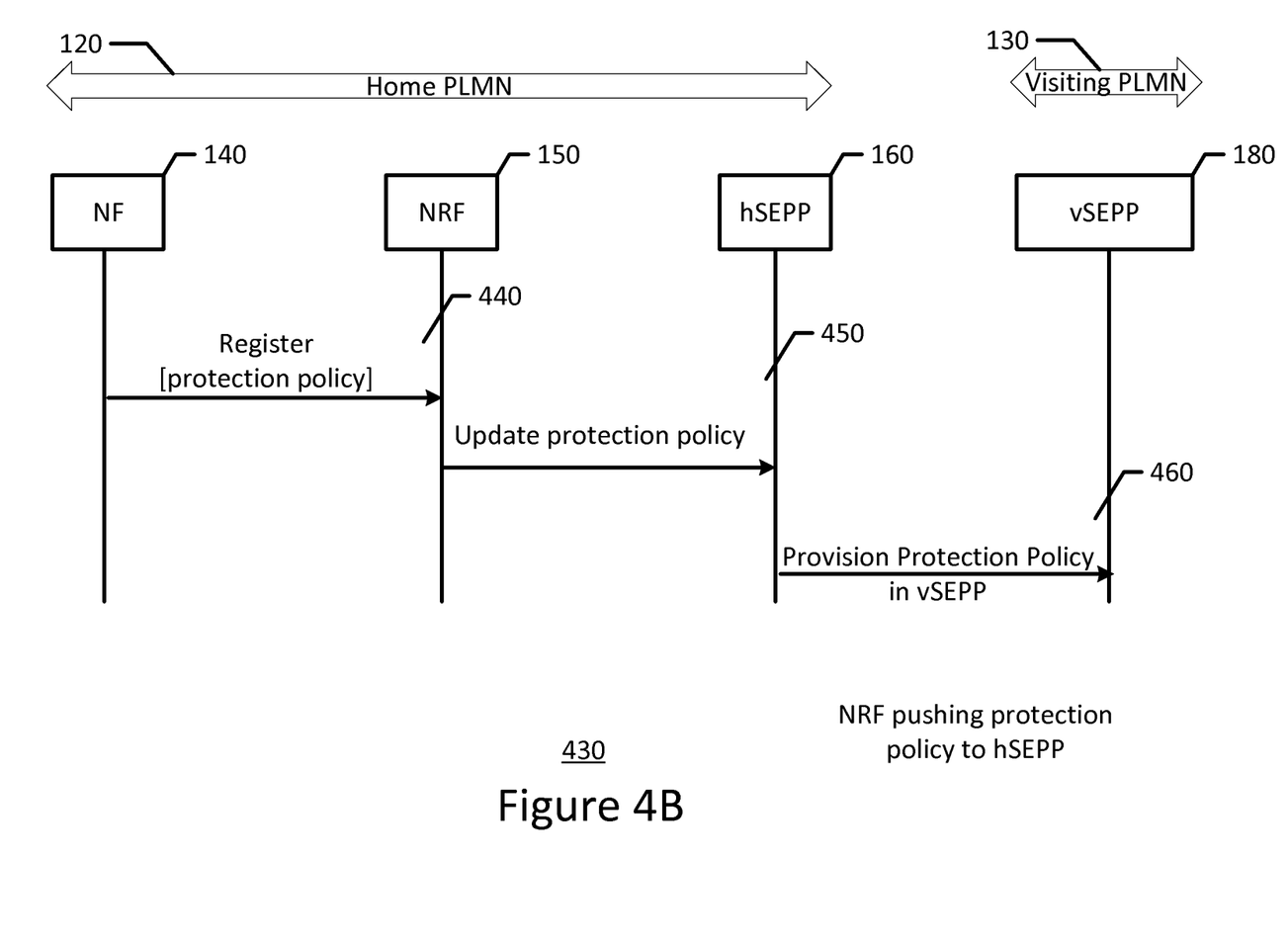
Figure 4C:
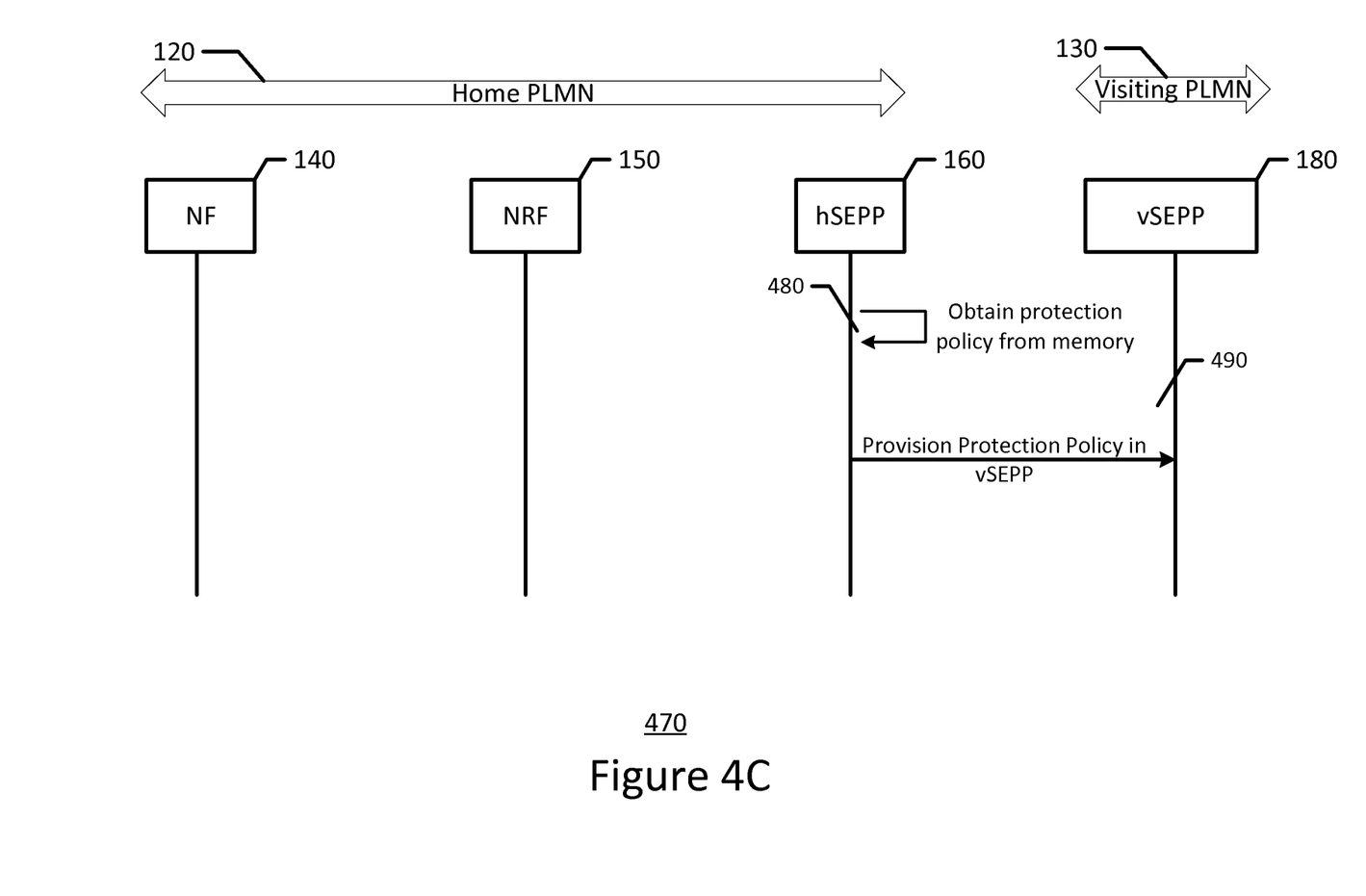

The operations performed by the apparatus 200 in order to provide for for remote provisioning of protection policies in an edge node based on signaling, such as N32 signaling, between edge nodes, are depicted in a flowchart of FIG. 3 and more particularly in conjunction with vSEPP 180 of the visiting PLMN 130 in the signal flow diagrams of FIGS. 4A, 4B, and 4C.

In an example embodiment, the apparatus 200 includes means, such as the proessor 210 or the like, configured to obtain, at the hSEPP, protection policy information from a local repository in the PLMN or from memory. See block 305 of FIG. 3. In some embodiments, utlizing a signaling interface that exists between the SEPP (e.g., hSEPP) and the RF, for example, for management and update of the protection policies applicable to the set of NFs in a PLMN, in the hPLMN, the hSEPP obtains protection policies, applicable to all NFs in the hPLMN, from the RF in hPLMN. The RF may standalone from existing NFs or may be a service in an existing NF. These policies may be pulled from the RF by the hSEPP, pushed to the hSEPP by the RF, for example, based on certain triggers such as for example, time of the day, a new agreement with a roaming partner, a policy update, a request from vSEPP, or the like. In some embodiments however, protection policy information may be provided out-of-band (e.g., hSEPP may be provisioned out-of-band with the protection policy information, such as, for example, via the OAM interface). Signal flow diagrams 4A, 4B, and 4C provide additional details.

Signal flow diagram 4A shows an embodiment in which the hSEPP is configured for pulling protection policy information from the NRF during initialization. In some embodiments, hSEPP 160 does the initial fetch of the protection policy information from the RF 150 as part of its initialization sequence. Additionally or alternatively, hSEPP 160 may also have a mechanism to pull the protection policy information from the RF 150 on a repeated, e.g., periodic, basis. Returning to FIG. 4A, as shown by signal flow 400 of FIG. 4A, at block 410, hSEPP 160 may fetch protection policy information from NRF 150, NRF 150 being the repository function that maintains a repository of protection policies. Subsequently, hSEPP 160 may provision the protection policy information in or to vSEPP 180. Signal flow diagram 4B shows an embodiment in which NRF is configured for pushing protection policy to hSEPP. Here, RF 150 may be configured to push the protection policy information to hSEPP 160 whenever there is an update to the protection policy information in its local store. This may be, for example, when a new Network Function type is introduced in the network and it comes with a unique set of protection policies that it registers with the RF. Turning now to FIG. 4B, according to some examples, the NF may provide its protection policy to the NRF when it registers with the NRF, as shown by signal flow 430 of FIG. 4B, at block 440, NF provides, for example, at registration, the protection policy information to the NRF. NRF, upon receiving new protection policy information or an update to the protection policy information, may then push the updated protection policy information, to the hSEPP, for every dynamic update of the policy. As such, RF, or NRF, may be configured to provide updated protection policy information to hSEPP at block 450. Subsequently, at block 460, hSEPP then provides the updated protection policy information to vSEPP. NF provides its protection policy to the NRF when it registers with the NRF. Signal flow diagram 4C shows an embodiment in which hSEPP obtains the protection policy information through local configuration. That is, hSEPP may be configured for obtaining the protection policy information from a local repository, for example, in the PLMN or from memory in the apparatus, for instance, if the protection policy information is already configured and cached. In some embodiments, hSEPP 160 may be configured via the OAM interace, for example, that directly configures hSEPP with the protection policy. Returning to FIG. 4C, as shown by signal flow 470 of FIG. 4C, at block 480, hSEPP 160 may obtain the protection policy information from memory. For example, as described above, obtaining of the proection policy may performed through an OAM interface. Subsequently, at block 490, hSEPP 160 may provision the protection policy information in or to vSEPP 180.

Returning to FIG. 3, the apparatus 200 includes means, such as the proessor 210 or the like, configured to distribute, via use of a signaling channel between two SEPPs, the protection policy to a partner vSEPP. See block 310 of FIG. 3. In some embodiments, upon obtaining an initial set of policies from the RF, hSEPP may use its established N32 signaling channel with the vSEPP to forward the policies to the vSEPP. Subsequently, in an instance in which and/or whenever the hSEPP receives an update of the protection policy information, whether it is via pull or push from the RF, such as described above with reference to FIGS. 4A and 4B, or via, for example, an OAM interface such as described in FIG. 4C, hSEPP may forward the new policy update to the vSEPP over the corresponding N32 signaling channel. As such, the apparatus 200 includes means, such as the proessor 210 or the like, configured to receive, at hSEPP, from the the RF, updated protection policy information in an instance in which an update occurs to the protection policy information in the local store of the RF. See block 315 of FIG. 3. The apparatus 200 further includes means, such as the proessor 210 or the like, configured to distribute, via use of the signaling channel, the updated protection policy to the vSEPP. See block 320 of FIG. 3. The vSEPP receives the initial policy information or the update over the N32 signaling channel and updates its local store.

Figure 5:
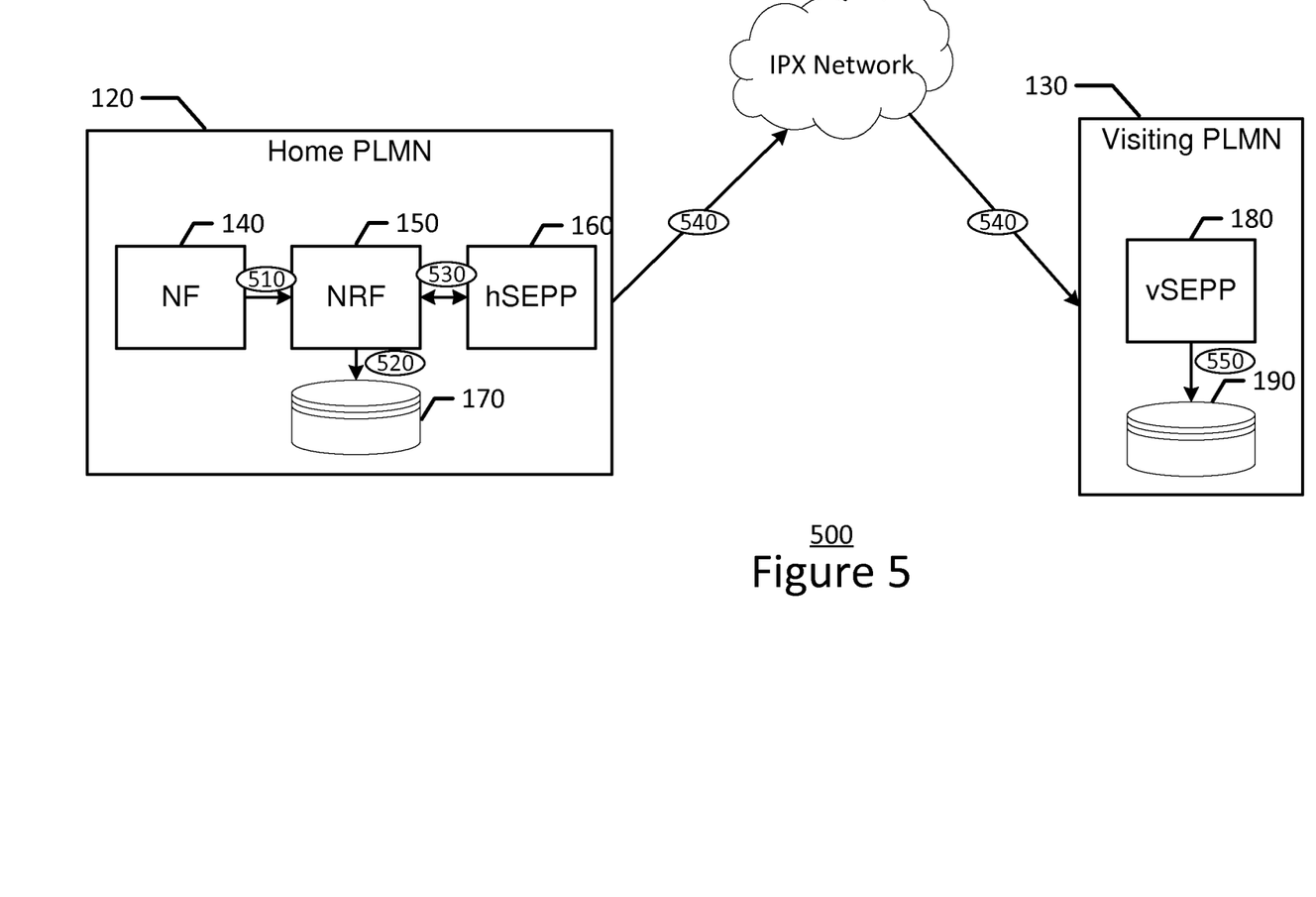
FIG. 5 is a block diagram of a system specifically configured to facilitate signaling-based remote provisioning and updating of the policy protection information and showing an order of operations to perform the signaling-based remote provisioning and updating of the policy protection information, in accordance with an example embodiment of the present disclosure.

FIG. 5 is a signal flow diagram showing an embodiment in which NRF acts as the Repository Function in the hPLMN. That is, in this embodiment, the NRF plays the role of the Repository Function. NRF stores protection policy information on a per NF type basis. Though, in other embodiments, the content in the protection policy information is not restricted to being stored on a per NF type basis, and may be stored on a per-roaming partner or roaming operator basis, for example, where vSEPP sits. In some embodiments, where protection policy information is configured on a per-roaming operator basis, content in the protection policy information may be applied differently based on the roaming partner or particular characteristics of a roaming partner, such as for example, geography.

The protection policy information in NRF may either be: a) statically provisioned via an OAM interface or b) dynamically built when a new NF Instance of a previously unregistered NF type, registers with the NRF. For example, when an NF of a newly introduced NF type registers with the NRF, NRF may be configured such that the protection policy information is dynamically built due to the new NF type with the NRF. In this scenario, the NF instance supplies its required protection policy information to the NRF at registration time. When there is an update to the protection policy in the NRF, the NRF executes, for example, a push of the policy information to the hSEPP. The hSEPP then forwards the policy information to the vSEPP over the N32 interface, as shown for example, in block 310 or 320 of FIG. 3.

Turning to FIG. 5, at block 510, NF provides its protection policy, for example, during registration. At block 520, NRF updates its local store. In some embodiments, NRF maintains this policy information on a per NF type basis. NRF updates its local store only when there is a change in policy for the existing NF type or there is a new NF type that is registering, for example, in block 510 above. At block 530, NRF pushes the updated protection policy information to hSEPP. During initialization or some part of the initial setup sequence, the hSEPP obtains the current protection policy information from the NRF. At block 540, hSEPP uses its existing N32 signaling channel with the vSEPP to provision the updated protection policy in the vSEPP. At block 550, vSEPP updates its local store. vSEPP is now able to apply protection on the HTTP messages destined to the hPLMN.

As described above, FIG. 3 is a flowchart of an apparatus 200, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 220 of an apparatus employing an embodiment of the present invention and executed by a processor 210 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
obtaining, at a home security edge protection proxy, a protection policy information from a local repository in a home network by pulling the protection policy information from a repository function by the home security edge protection proxy, the home security edge protection proxy being a network node at a boundary of the home network, and the home network being a public land mobile network, wherein the protection policy is obtained in response to one of: a time of the day, a new agreement with a roaming partner, a policy update, or a request from a visiting security edge protection proxy, and wherein obtaining, at the home security edge protection proxy, the protection policy information comprises receiving, at the home security edge protection proxy, from the repository function, the protection policy information or provisioning, at the home security edge protection proxy, from an Operation, Administration, and Maintenance interface, the protection policy information; and distributing, via a signaling interface, the protection policy information to a visited security edge protection proxy within a visited public land mobile network, the visited security edge protection proxy being a network node at a boundary of the visited public land mobile network, wherein the protection policy information comprises information regarding protection of signaling messages addressed for network functions hosted in the home public land mobile network and configured for enabling the visited security edge protection proxy to selectively protect outgoing messages addressed to network functions in the home network.

2. The method according to claim 1, wherein obtaining, at the home security edge protection proxy, of the protection policy information further comprises loading the protection policy information from a configuration stored at the home security edge protection proxy.

3. The method according to claim 1, wherein the signaling interface comprises an N32 interface.

4. The method according to claim 1, further comprising:
receiving, at the home security edge protection proxy, from the repository function, updated protection policy information in an instance in which an update occurs to the protection policy information; and
distributing, via the signaling interface, the updated protection policy information to the visited security edge protection proxy.

5. The method according to claim 1, wherein obtaining, at the home security edge protection proxy, of the protection policy information further comprises receiving out-of-band at the home security edge protection proxy, the protection policy information.

6. The method according to claim 1, wherein the protection policy information is stored on a per roaming operator basis.

7. The method according to claim 1, wherein the protection policy information is stored on a per network function type basis, and further comprising:
receiving updated protection policy information only upon a change in policy for an existing network function type or registration of a new network function type.

8. An apparatus comprising at least one processor and at least one memory including computer program code for one or more programs, the at least one memory and the computer program code configured to, with the at least one processor, cause the apparatus at least to:
obtain, at a home security edge protection proxy, a protection policy information from a local repository in a home network by pulling the protection policy information from a repository function by the home security edge protection proxy, the home security edge protection proxy being a network node at a boundary of the home network, and the home network being a public land mobile network, wherein the protection policy is obtained in response to one of: a time of the day, a new agreement with a roaming partner, a policy update, or a request from a visiting security edge protection proxy, and wherein the apparatus is caused to obtain, at the home security edge protection proxy, the protection policy information by receiving, at the home security edge protection proxy, from the repository function, the protection policy information or by provisioning, at the home security edge protection proxy, from an Operation, Administration, and Maintenance interface, the protection policy information; and distribute, via a signaling interface, the protection policy information to a visited security edge protection proxy within a visited public land mobile network, the visited security edge protection proxy being a network node at a boundary of the visited public land mobile network, wherein the protection policy information comprises information regarding protection of signaling messages addressed for network functions hosted in the home public land mobile network and configured for enabling the visited security edge protection proxy to selectively protect outgoing messages addressed to network functions in the home network.

9. The apparatus according to claim 8, wherein the obtaining, at the home security edge protection proxy, of the protection policy information is further caused to load the protection policy information from a configuration stored at the home security edge protection proxy.

10. The apparatus according to claim 8, wherein the signaling interface comprises an N32 interface.

11. The apparatus according to claim 8, wherein the at least one memory and the computer program code are further configured to, with the at least one processor, cause the apparatus to:
receive, at the home security edge protection proxy, from the repository function, updated protection policy information in an instance in which an update occurs to the protection policy information; and
distribute, via the signaling interface, the updated protection policy information to the visited security edge protection proxy.

12. The apparatus according to claim 8, wherein the obtaining, at the home security edge protection proxy, of the protection policy information is further caused to receive out-of-band at the home security edge protection proxy, the protection policy information.

13. The apparatus according to claim 8, wherein the protection policy information is stored on a per roaming operator basis.

14. The apparatus according to claim 8, wherein the protection policy information is stored on a per network function type basis, and wherein the at least one memory and the computer program code are further configured to, with the at least one processor, cause the apparatus to:
receive updated protection policy information only upon a change in policy for an existing network function type or registration of a new network function type.

15. A non-transitory computer readable medium comprising program instructions for causing an apparatus to perform at least the following:
obtain, at a home security edge protection proxy, a protection policy information from a local repository in a home network by pulling the protection policy information from a repository function by the home security edge protection proxy, the home security edge protection proxy being a network node at a boundary of the home network, and the home network being a public land mobile network, wherein the protection policy is obtained in response to one of: a time of the day, a new agreement with a roaming partner, a policy update, or a request from a visiting security edge protection proxy, and wherein the apparatus is caused to obtain, at the home security edge protection proxy, the protection policy information by receiving, at the home security edge protection proxy, from the repository function, the protection policy information or by provisioning, at the home security edge protection proxy, from an Operation, Administration, and Maintenance interface, the protection policy information; and distribute, via a signaling interface, the protection policy information to a visited security edge protection proxy within a visited public land mobile network, the visited security edge protection proxy being a network node at a boundary of the visited public land mobile network, wherein the protection policy information comprises information regarding protection of signaling messages addressed for network functions hosted in the home public land mobile network and configured for enabling the visited security edge protection proxy to selectively protect outgoing messages addressed to network functions in the home network.

* * * * *

UNITED STATES PATENT AND TRADEMARK OFFICE
CERTIFICATE OF CORRECTION

| | |
|---|---|
| PATENT NO. | : 11,582,599 B2 |
| APPLICATION NO. | : 17/045965 |
| DATED | : February 14, 2023 |
| INVENTOR(S) | : Suresh Nair et al. |

It is certified that error appears in the above-identified patent and that said Letters Patent is hereby corrected as shown below:

On the Title Page

In Column 1, item (87), under "PCT Pub. Date", Line 1, delete "Oct. 17, 2017" and insert -- Oct. 17, 2019 --, therefor.

Signed and Sealed this
Twenty-ninth Day of August, 2023

Katherine Kelly Vidal
*Director of the United States Patent and Trademark Office*